(12) United States Patent
Gaffiero et al.

(10) Patent No.: US 9,673,554 B2
(45) Date of Patent: Jun. 6, 2017

(54) AIRCRAFT ROTOR FITTED WITH A CONNECTOR DEVICE FOR CONNECTING ELECTRICAL POWER BETWEEN A HUB AND BLADES OF THE ROTOR

(71) Applicant: AIRBUS HELICOPTERS, Marignane (FR)

(72) Inventors: Jacques Gaffiero, Paris (FR); Andre Amari, La Chapelle En Serval (FR); Benedicte Rinaldi, Paris (FR); David Broucke, Gournay sur Marne (FR)

(73) Assignee: AIRBUS HELICOPTERS, Marignane (FR)

( * ) Notice: Subject to any disclaimer, the term of this patent is extended or adjusted under 35 U.S.C. 154(b) by 949 days.

(21) Appl. No.: 13/944,255

(22) Filed: Jul. 17, 2013

(65) Prior Publication Data

US 2014/0024251 A1 Jan. 23, 2014

(30) Foreign Application Priority Data

Jul. 18, 2012 (FR) ..................................... 12 02032

(51) Int. Cl.
| | |
|---|---|
| H01R 13/46 | (2006.01) |
| B64D 15/12 | (2006.01) |
| B64C 11/06 | (2006.01) |
| B64D 27/00 | (2006.01) |

(52) U.S. Cl.
CPC .............. *H01R 13/46* (2013.01); *B64C 11/06* (2013.01); *B64D 15/12* (2013.01); *B64D 2027/005* (2013.01); *Y02T 50/66* (2013.01)

(58) Field of Classification Search
CPC ........ H01R 35/00; H01R 35/04; B64D 15/12; B64C 11/06; B64C 11/065

USPC .......................... 416/39, 95, 146 R; 439/527
See application file for complete search history.

(56) References Cited

U.S. PATENT DOCUMENTS

| | | | |
|---|---|---|---|
| 3,042,346 A | 7/1962 | Hawley | |
| 4,944,655 A * | 7/1990 | Merz ....................... | B64C 11/26 416/146 R |
| 5,174,717 A | 12/1992 | Moore | |
| 5,709,532 A | 1/1998 | Giamati et al. | |
| 6,358,006 B1 | 3/2002 | Weyandt et al. | |
| 7,585,156 B2 * | 9/2009 | Oldroyd .................. | B32B 5/024 416/230 |

FOREIGN PATENT DOCUMENTS

FR        2793469 A1      11/2000

OTHER PUBLICATIONS

Search Report and Written Opinion; Application No. FR 1202032; dated Mar. 5, 2013.

\* cited by examiner

*Primary Examiner* — Craig Kim
*Assistant Examiner* — Julian Getachew
(74) *Attorney, Agent, or Firm* — Brooks Kushman P.C.

(57) ABSTRACT

The invention provides a rotary-wing aircraft rotor fitted with a connector device for connecting electrical power between a hub (1) and blades (2) of said rotor. For each of the blades (2), a wired connection (4) provides an electrical connection between the hub (1) and the blade (2). A guide path (13, 14, 15, 16, 17) holds the wired connection (4) in shape and guides it under tension to move over itself, accompanying the pivoting movement of the blade root (3).

20 Claims, 2 Drawing Sheets

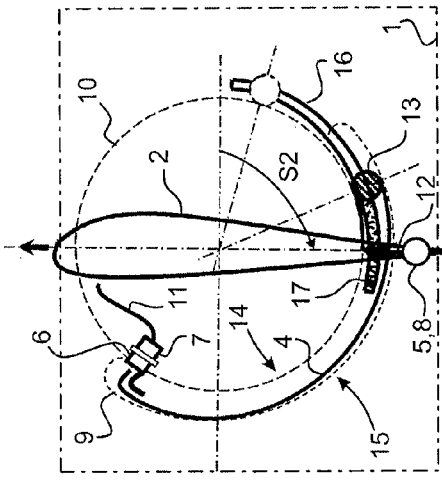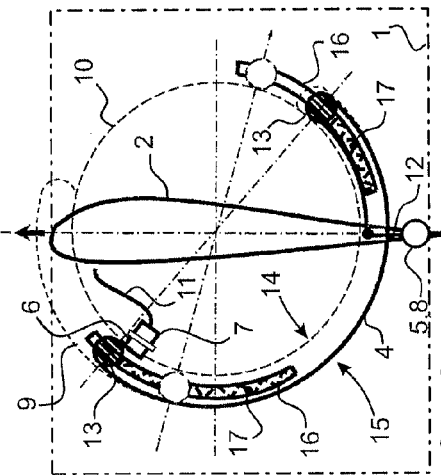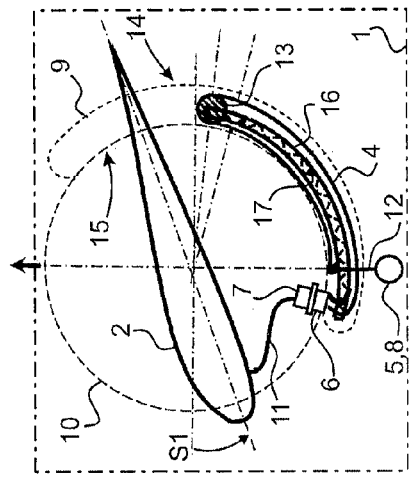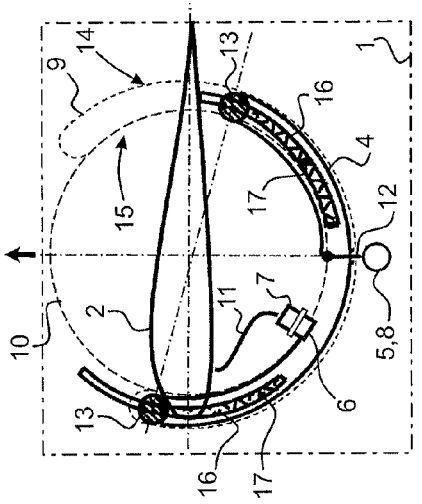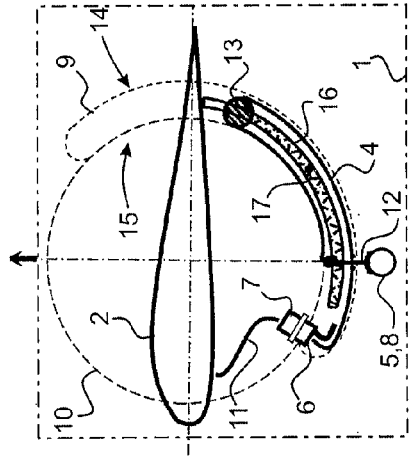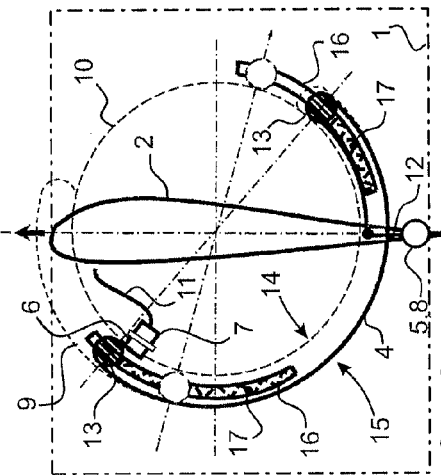

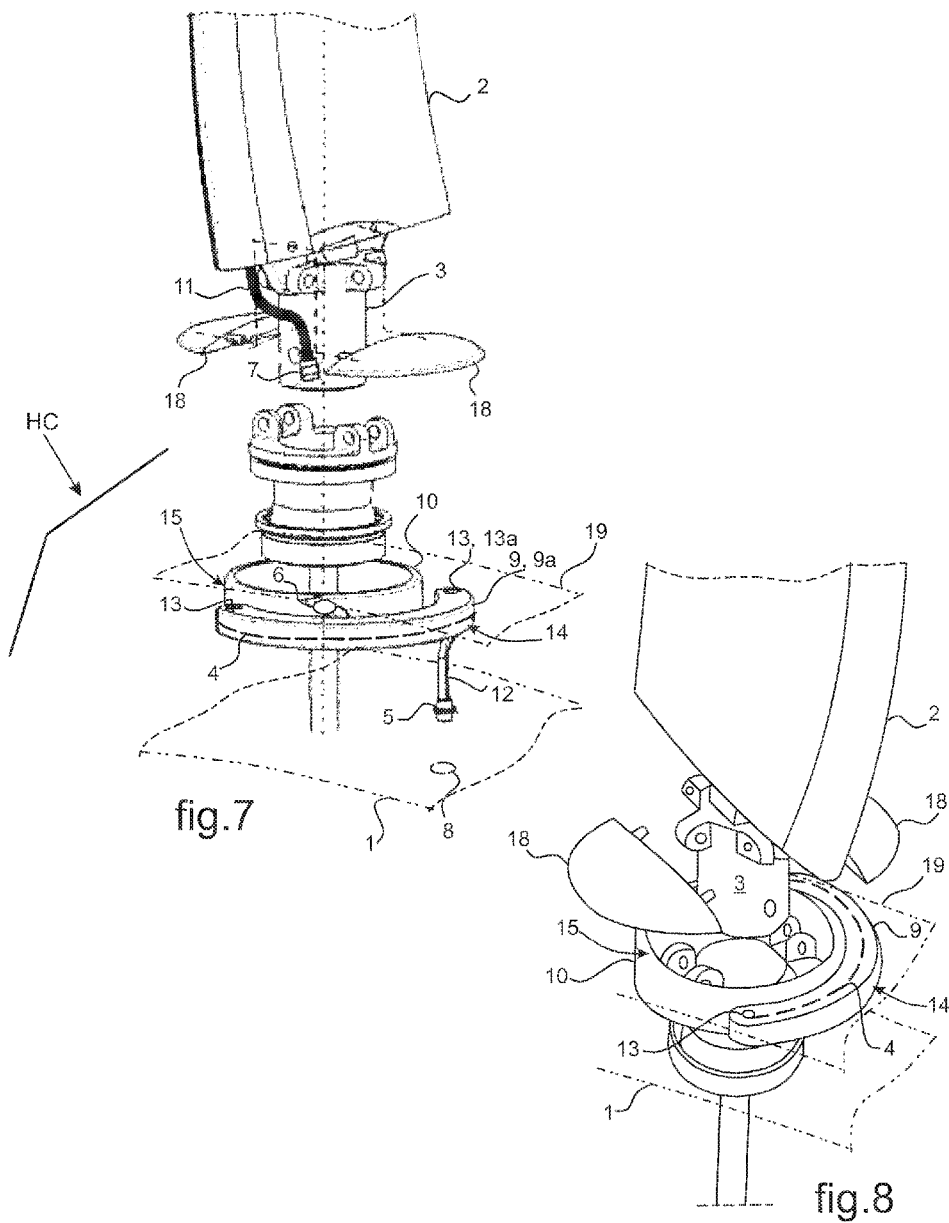

AIRCRAFT ROTOR FITTED WITH A CONNECTOR DEVICE FOR CONNECTING ELECTRICAL POWER BETWEEN A HUB AND BLADES OF THE ROTOR

CROSS REFERENCE TO RELATED APPLICATIONS

This application claims priority to French patent application No. FR 12/02032 filed on Jul. 18, 2012, the disclosure of which is incorporated in its entirety by reference herein.

BACKGROUND OF THE INVENTION (1) Field of the Invention

The present invention is the field of equipment for an aircraft fitted with at least one rotor, an airplane having a propulsive propeller, or more specifically a rotorcraft. The present invention relates more particularly to electrical connector devices for electrical connection between a hub and the blades of a rotor of the aircraft. Such an electrical connector provides electrical power to apparatus that is incorporated in each of the blades individually, in particular de-icer apparatus for de-icing such a blade by electric heating.

(2) Description of Related Art

Aircraft include aircraft that are provided with at least one rotor having a plurality of blades. The blades are mounted radially distributed on a hub for driving them in rotation, the hub itself being driven in rotation by a drive source of the aircraft. In particular, such a drive source is formed of a main gearbox that is driven by a power plant of the aircraft.

By way of example, for an airplane having lift that is obtained by a fixed wing, at least one rotor formed of a propulsive propeller propels the airplane in translation.

Also by way of example, for a rotorcraft, at least one rotary wing is formed of a main rotor having a substantially vertical axis, which main rotor provides the rotorcraft at least with lift, and possibly also propels it in translation and/or guides it in flight. Rotorcraft are also commonly provided with an auxiliary rotor such as a tail rotor or a propulsive propeller in the context of a rotorcraft that is fast and that has a long range. Such an auxiliary rotor is commonly used to guide the rotorcraft in yaw, or even to propel it in translation for a rotor formed of a propulsive propeller for propelling the rotorcraft in translation.

In order to vary the thrust exerted by a propulsive propeller or a said tail rotor, or in order to vary the lift provided by a said main rotor, rotor aircraft are provided with means for varying the collective pitch of the blades of at least one of their rotors. Varying the collective pitch of the blades makes it possible to increase the thrust exerted by the rotor, such as in lift for a said main rotor, such as in yaw for a said tail rotor, or such as in propulsion in translation for a said propulsive propeller.

Specifically for a helicopter, the main rotor not only provides the rotorcraft with lift, but also propels it and/or guides it in flight. Varying the pitch of the blades of the main rotor is not only a variation of the collective pitch so as to modify the lift and the propulsion of the rotorcraft, but it is also a variation of the cyclic pitch so as to modify the behavior of the rotorcraft in flight, both in pitching and in roll.

In order to make it possible to vary their pitch collectively and/or where appropriate cyclically, the blades are mounted on the hub to pivot individually in their general plane, by means of respective blade roots. In various variant embodiments, a blade root may be incorporated in the blade for mounting the blade on the hub, or it may be formed of a junction member that carries a blade and that is mounted on the hub. By way of indication, the blades pivot on the hub through an angular extent of plus or minus 120°.

The blades are suitable for incorporating, or for being fitted individually with, one or more kinds of electrical apparatus, such as a de-icer apparatus in particular. This poses the problem of installing means on the rotor, means for delivering electrical power from the hub to the blades despite them being pivotally mounted on the hub.

The hub is provided with an electrical power take-off making it possible to power said electrical apparatus fitted individually on the blades. Such a take-off is fed with electrical power from an electrical power source that is fitted on the aircraft, such as an on-board electricity network or any other electrical power resource of the aircraft. The hub is provided with electrical connection means for connecting to said on-board network via a mast that carries the hub. By way of example, such connector means are rotary means having slip rings or other similar means for electrically connecting two members that rotate relative to each another.

Each blade is electrically connected to said take-off via a flexible wired connection for connecting a connector on the hub with a connector on the blade. The wired connection may be made up of one or more wires depending on the electricity needs of the blade. Traditionally, the connection between the blade and the electricity take-off is maintained, despite the pivoting of the blades on the hub, by taking advantage of the flexibility and of the appropriate length of the wired connection.

However, the blades are placed on the rotorcraft in an environment that is hostile and they are subjected to large centrifugal forces. The wired connections need to withstand such hostile environments and centrifugal forces, in addition to the twisting stresses to which they are subjected under the effect of the blades pivoting. Consequently, the structure of the wired connections needs to be robust, whilst nevertheless being compatible with the need for being flexible. However, frequent maintenance operations are necessary. Such maintenance operations are costly, both in terms of the intrinsic cost of the wired connections, and in terms of the operations required to replace them.

Moreover, in addition to their individual de-icers, the blades are also potentially fitted with various other kinds of electrical apparatus. By way of example, it is known to incorporate a device in the blades that makes it possible to vary the angle of incidence of the blades by twisting them in their general plane. Such devices commonly use at least one electrical apparatus that needs to be powered with electricity. Complicating the blades in this way results in an increase in the number of wires that must be incorporated in the wired connections, to the detriment of their flexibility, or in an increase in the number of said wired connections for each of the blades.

In this context, various solutions have been proposed to mitigate the drawbacks induced by the frequent maintenance operations on such wired connections.

By way of example, it has been proposed to simplify the ways in which wired connections can be connected to the hub and to the blades respectively, so as to make maintenance operations easier to perform.

By way of example, it has also been proposed to protect the wired connections from the hostile environment of the rotor, by protecting them with caps. However, such a protection solution presents the drawback of affecting the ability of the wired connections to move over themselves, thus presenting difficulty for the wired connections to accompany the pivoting movements of the blades, or to adapt in shape under the effect of the centrifugal forces that are generated by the rotor rotating.

In order to understand the difficulties to be overcome, and in order to discover the technological background close to the context of the present invention, reference can be made to documents U.S. Pat. No. 5,174,717 (SAFEWAY PRODUCTS INC) and U.S. Pat. No. 6,358,006 (THE BF GOODRICH COMPANY), or to document U.S. Pat. No. 5,709,532 (THE BF GOODRICH COMPANY) and document FR 2 793 469 (WL GORE ASS. INC.).

It has also been proposed by document U.S. Pat. No. 3,042,346 (HAWLEY JAMES F) to equip a propulsive propeller with flanges that guide an elastically-deformable wiring harness between them, which harness electrically connects a pivotable blade to a rotary hub of the propulsive propeller. The harness is contained in a gap that protects it from the centrifugal forces that are generated under the effect of the rotor rotating, the ability of the harness to deform elastically making it possible to vary its length between the blade and the hub so as to accompany the pivoting of the blade on the hub.

BRIEF SUMMARY OF THE INVENTION

The object of the present invention is to propose an aircraft rotor having blades that are each provided with at least one electrical apparatus, in particular de-icer apparatus. Such an aircraft rotor is potentially a propulsive propeller of a propeller airplane or of a high-speed long-range rotorcraft, or it is a main rotor or an auxiliary rotor of a rotorcraft.

The rotary-wing aircraft rotor of the present invention is, in particular, fitted with a connector device for connecting electrical power between a hub and the blades of said rotor. Such a connector device is organized so as to deliver electrical power to each of the blades from an electrical power take-off of the hub, so as to electrically power at least one said electrical apparatus that is incorporated in each of the blades. Such a connector device makes use, in particular, of a set of wired connections, each having a connector at each of its ends for co-operating with connectors that are respectively mounted on the hub and on a blade.

In the context of the above-mentioned constraints, a particular object of the present invention is to reduce the costs induced by the maintenance operations for maintaining the wired connections of the electrical connector device.

More particularly, an object of the present invention is to limit the harmful effects produced on said wired connections by the hostile environment of the rotor, by the centrifugal forces generated under the effect of it being set into rotation, and by the movement constraints of the wired connections induced by the pivoting of the blades.

Another particular object of the present invention is to propose fitting the rotor with a said connector device that is capable of powering a plurality of distinct electrical apparatuses with which each blade may be individually equipped.

It is so desired that the optimized possibility of electrically powering a plurality of electrical apparatuses with which each blade is individually equipped can be achieved while limiting the structural and maintenance costs of the connector device. It is particularly desired to avoid unduly complicating the connector device, essentially by avoiding complicating the ways in which wired connections can be connected, both electrically and mechanically, to the hub and to each of the blades, while optimizing the number of electrical paths available to each of the blades, and while protecting the wired connections as much as possible from the various stresses to which they are going to be subjected.

The rotary-wing aircraft rotor of the present invention is fitted with a connector device for connecting electrical power between a hub and blades of said rotor. Each of the blades is provided with a blade root via which the blade is mounted individually on the hub so as to pivot in its general plane about a pivot axis. The blade root may equally well be incorporated in the blade, or it may be formed by a junction member, such as a sleeve or the like. Such a junction member securely carries the blade and is pivotably mounted on the hub.

For each of the blades, said connector device comprises, in particular, at least one wired connection that acts, via connectors fitted to its ends, to connect together a hub connector that is carried by the hub and a blade connector that is carried by the blade.

Said connector device further comprises attachment means for attaching the wired connection, between its ends, to the hub and to the blade root respectively, accompanying pivoting movement of the blade root. The end connectors of the wired connection co-operate with the hub connector and with the blade connector respectively, so as to power the blade with electrical power.

For each of the blades, said connector device further comprises a guide path for guiding the wired connection of each of the blades, the wired connection being moved under the effect of the blade pivoting in its general plane.

In the present invention, such a rotor is mainly recognizable in that, for each of the blades, the guide path includes tensioning means for putting the wired connection resiliently under tension, the wired connection being guided to move over itself under tension by said path, while accompanying the pivoting movement of the blade root.

The said tensioning means that the guide path includes maintain the wired connection in shape along the guide path, despite it moving over itself as a result of the blade pivoting. Such tensioning means assist the movement of the wired connection over itself being accompanied by the guide path, with such assistance being provided despite the potentially large amplitude of the movement of the wired connection over itself and despite the repeated driving of the wired connection, possibly in repetitive reversal directions of movements along the path.

Such arrangements advantageously make it possible:

to limit the tensions to which the wired connection is subjected under the effect of the pivoting of the blade to which it is connected, and in particular they make it possible to avoid the wired connection being subjected to such tensions in twisting;

to protect the wired connection from tensions that might potentially be induced by the centrifugal force to which it is subjected under the effect of the hub rotating, the wired connection being held in shape by the guide path, despite said wired connection moving over itself; it being possible for the wired connection to be held in shape in a configuration that is selected freely depending on the arrangement of the guide path;

to lighten structurally the reinforcement needed for the wired connection, so as to make it easier for it to be flexible but without causing it to degrade more under the effect of the stresses to which the wired connection might potentially be subjected overall;

to simplify the ways in which the connectors fitted to the wired connection can be connected to the connectors fitted respectively to the hub and to the blade roots. Such simplification is made possible, in particular, by the wired connection being protected from tensions to which it might be subjected and by said lightening of its structure, and it makes it possible to arrange for the connectors fitted to the wired connection and the connectors fitted to the hub and the blade root to be connected and disconnected easily, with such connectors possibly being no more than coaxial plugs.

Such advantages also make it possible advantageously to arrange the wired connection as a flat cable that incorporates at least one, and preferably a plurality of, wires. Such a flat cable can easily be held in its general plane by the path, avoiding said wires being deformed. Such a flat cable also has the advantages of being obtained at lower cost, of being able to incorporate a large number of wires that can be used individually in groups so as to electrically power various kinds of electrical apparatus that are fitted to the blade.

In particular, the path is a means for guiding the wired connection in movement over itself and for holding it in shape. Advantageously, the path may be used to make the wired connection compact and to contain it in a predefined volume, without affecting the length of wired connection that is required for connecting the hub connector to the blade-root connector.

To this end and in an advantageous embodiment, the path includes at least one deflector member for causing the wired connection to back onto itself, in particular to double back onto itself. Said at least one deflector member bends the wired connection, shaping it into at least one loop that moves over itself, bearing against said deflector member in sliding or in turning. The wired connection bearing against said deflector member induces said wired connection to bend, and causes it to back onto itself, thereby forming it into a loop. The movement of the loop over itself makes it possible to limit the size of the wired connection, in particular for a wired connection arranged as a flat cable.

In a preferred embodiment and in order to optimize the compactness of the wired connection, the path includes at least two said deflector members in engagement on opposite ends of the loop that is shaped overall by the guide path. There may be numerous deflector members that are distributed along the path between two ends of the loop that is shaped overall by the path.

The path is preferably provided with a plurality of deflector members making it possible to optimize the use of the length of the wired connection in the loop, but without unduly increasing the overall size of the wired connection. Shaping the wired connection into a loop makes it possible to optimize its available length so as to accompany pivoting of the blade through a significant amplitude, e.g. of about 120° or even more. The length of wire can be adapted easily so as to adapt the connector device easily to any rotor, but without unduly increasing its size, nor affecting its ease of maintenance.

The wired connection is positioned to bear against at least one said deflector member, so as to change the direction in which it extends and so as to impart said loop shape thereto. In a preferred embodiment, the wired connection is bent through about 360° so as to hold the shape of the loop that is formed overall by the wired connection, while limiting the radial size of the wired connection relative to the pivot axis of the blade. However, it is also possible to place at least one intermediate deflector member along the path, so as to adapt the shape of the loop to match a chosen configuration.

The overall size of the loop and the length of the wired connection included in the loop, may be adapted easily depending on needs, but without affecting the protection of the wired connection forms various stresses to which it is subjected. The connector device can be transposed easily between rotors of respective different structures and organizations.

Depending on needs, the path may include a plurality of intermediate bearing members distributed along the length of the loop between its ends, so as to better hold said loop in shape in a desired configuration, such as a preferably arcuate configuration that is centered on the pivot axis.

In a simple embodiment, said deflector members and/or bearing members are arranged as wheels. Such a wheel is suitable for being mounted stationary or rotatably, or even and preferably it is suitable for bearing resiliently against the wired connection.

It is appropriate to limit the size of the wired connection as much as possible in the vicinity of the blade root, and to minimize as much as possible the stresses to which the wired connection is subjected.

To this end and in an advantageous embodiment, the wired connection, and more particularly said overall loop, is held by the path in a generally arcuate shape that is centered on the pivot axis. The wired connection, and more particularly said overall loop, is guided to move over itself about said pivot axis. The path guides the wired connection to move over itself about said pivot axis, under the effect of it being caused to move over itself by pivoting of the blade.

Such a generally arcuate shape of the wired connection, or more particularly of said overall loop, is potentially obtained from guide members of simple structure making up the path. Such guide members may be formed of one or more deflector members, potentially associated with one or more bearing fingers and/or with one or more guide ramps.

The path is potentially no more than an assembly of structurally-simple members that may be housed, at least in part, in a mounting module that can be easily implanted equally well on the blade root or on the hub. By way of example, such a mounting module is a housing that houses the wired connection and at least one of said guide members, without prejudicing the specific way in which the guide member is implanted, equally well on the hub or on the blade root.

The natural strength of the wired connection provided by its structure can potentially be used to hold the wired connection in an arcuate shape, in particular by using a said flat cable that forms the wired connection. Such a flat cable may be easily held in shape by the path in its general plane, considered along its dimension that extends parallel to said pivot axis of the blade, by using its natural strength in said general plane.

To this end, the guide members that make up the path may include a guide groove or the like for guiding the flat cable in its said general plane. By way of example, at least one of the members that form the path is arranged as a wheel that is oriented along an extension axis that is parallel to the pivot axis of the blade. Such a wheel, that may equally well form a said deflector member or a said bearing member, may be arranged as a pulley wheel, forming a housing for localized guidance of the flat cable in its general plane.

The path preferably includes two facing curved walls that are centered on the pivot axis. Said walls form between them a space for holding the wired connection in an arcuate shape so as to prevent it from deforming away from such an arcuate shape. It should be considered that such deformation could, in particular, be caused by the effect of the centrifugal forces generated by the hub being set into rotation.

It should be considered that the path includes, in particular, at least one guide member for guiding and shaping the wired connection so that it is movable over itself. Said guide member may comprise at least any of the following guide members:

at least one deflector member for causing the wired connection to back onto itself into at least one loop. Said loop is movable over itself while accompanying the pivoting movement of the blade;

one or more bearing fingers distributed along the wired connection. The bearing finger(s) hold the wired connection in shape, such as in said arcuate shape;

at least one guide ramp for guiding the wired connection in shape, such as in said arcuate shape.

Such an enumeration of potential guide members is given by way of indication, and cannot be considered as restrictive with regard to any particular arrangement of the path, selected depending on a configuration that is desired for shaping the wired connection by the path.

In this context, said tensioning means for putting the wired connection under tension may equally well be interposed between:

the wired connection and at least one of a said guide member; and/or the wired connection and the hub, via at least one of a said guide member.

More particularly, said tensioning means for putting the loop under tension are suitable for being incorporated in at least any of said guide member(s). By way of example, at least one of the deflector members and/or of the bearing fingers is arranged as a wheel that incorporates an elastically-deformable member. Also by way of example, at least one of the deflector members and/or of the bearing fingers is arranged as an eccentric wheel. Also by way of example, an elastically-deformable member is interposed between the deflector member and/or the bearing fingers, and the member on which the deflector member and/or the bearing fingers are mounted, in particular the hub. Also by way of example, a said guide ramp may comprise a spring blade against which the wired connection bears.

In an advantageous embodiment, said at least one deflector member is guided to move along a shaped track, while accompanying the movement of the wired connection over itself. Such arrangements make it possible to reduce the length of the wired connection without affecting its ability to accompany the movement for any one angular stroke of a blade of any rotor.

Said shaped track is preferably formed on the hub and guides the movement of the deflector member under the effect of the traction exerted by the wired connection that is caused to move over itself by the pivoting of the blade, and/or exerted by elastically-deformable means.

More particularly, said tensioning means for putting the wired connection under tension are advantageously used to form return means for returning the deflector member. Such return means drive the deflector member that thus exerts thrust on the wired connection, accompanying pivoting of the blade, in a direction opposite to the direction in which the wired connection exerts said traction against the deflector member.

To this end, said tensioning means for putting the wired connection under tension comprise movably mounting the deflector member on the hub, and interposing elastically-deformable means between the deflector member and the shaped track formed on the hub. Such elastically-deformable means form means for returning the deflector member into position, and for driving the wired connection under the effect of thrust exerted by the deflector member on the wired connection while accompanying pivoting of the blade in a predefined direction.

Advantageously, the wired connection is housed, at least in part, inside a protective housing. Since the wired connection is held in said arcuate shape, such a protective housing can be compact, in particular radially, by being at least arcuate in shape if not ring shaped.

More particularly, the housing is at least arcuate in shape if not ring shaped, and is preferably mounted on the blade root, with which blade root the housing moves together in pivoting.

Advantageously, the housing is placed around at least part of the blade root, and more particularly is placed around at least part of a peripheral ring that is mounted on the blade root and that carries the housing.

In this embodiment, the housing moves together in pivoting with the blade root. In another embodiment, the housing is suitable for mounting on the hub, to the detriment of its size being minimized by being mounted on the blade root.

In a preferred embodiment, an assembly comprising at least one said guide member and the wired connection is advantageously housed in a said housing. Advantageously, such a housing forms a mounting module for mounting at least the wired connection if not also at least one said guide member that may equally well be on the hub or on the blade root.

The housing is preferably carried by a ring that is mounted on the blade root and that is centered on said pivot axis. Advantageously, at its end face oriented towards the blade, said ring is closed by covers that are mounted on the blade root and that are arranged laterally, on either side of the blade.

The hub is preferably fitted with a peripheral shield that is centered on the axis of rotation of the hub. Said shield forms a protective member for protecting the housing, and includes respective through holes through which there pass respective rings that are mounted on the various blade roots.

It should be considered that the guide path is advantageously used to form, at least in part, the attachment means for attaching the wired connection respectively on the hub and on the blade root.

By way of example and in an advantageous embodiment, said attachment means are formed by a said housing and by at least one said guide member. It should be considered that the housing and said at least guide member are suitable for being mounted on respective members of the group formed by the hub and the blade root.

Since the wired connection is protected significantly from stresses, the connectors are protected from forces that might break the co-operation between them. The connectors may be of a structure that is simple, such as being arranged in connectors of the type having coaxial plugs for interfitting and for electrical connection.

As mentioned above, the wired connection is preferably arranged as a flat cable that incorporates at least one wire, said flat cable being held in shape in its general plane by the path.

In the context of the present invention, relative pivoting movement between the hub and the blade root about said pivot axis is taken into consideration. Said path provides guidance and a possible return of the wired connection over itself with regard to said relative movement.

Consequently, it should be considered that the path is potentially carried by a member of the rotor, which member may equally well be formed by the blade root or by the hub.

More particularly, the path is suitable for being mounted, at least in part, equally well on the hub and on the blade root.

The present invention also provides an aircraft provided with a rotor as described above. By way of example, such an aircraft is an airplane having a propulsive propeller, or a rotorcraft provided with at least one rotor. Such a rotorcraft rotor is, in particular, at least a main rotor, or a tail rotor or a propulsive propeller in the context of a rotorcraft that has a high forward speed and a long range.

BRIEF DESCRIPTION OF THE SEVERAL VIEWS OF THE DRAWINGS

Embodiments of the present invention are described below with reference to the figures of the accompanying drawings, in which:

FIGS. 1 to 3 are diagrams showing a connector device for connecting electrical power between a hub and a blade of an aircraft rotor in an embodiment of the present invention, said device being shown in FIGS. 1 to 3 in respective different pivot positions of the blade.

FIGS. 4 to 6 are diagrams showing a connector device for connecting electrical power between a hub and a blade of an aircraft rotor in another embodiment of the present invention, said device being shown in FIGS. 4 to 6 in respective different pivot positions of the blade.

FIGS. 7 and 8 are exploded perspective views of a connector device for connecting electrical power between a hub and a blade of an aircraft rotor in an embodiment of the present invention.

DETAILED DESCRIPTION OF THE INVENTION

In FIG. 7 is shown a rotary-wing aircraft HC. In FIGS. 1 to 8, a rotor of the rotary-wing aircraft HC comprises a hub 1 on which blades 2 are pivotally mounted. FIGS. 7 and 8 show an example of pivotally mounting a blade 2 on the hub 1 by means of a blade root 3. The blades 2 are suitable for incorporating electrical apparatus, such as de-icer apparatus, that needs to be powered electrically from the hub 1. It should be understood that the ways in which electrical power can be brought from an electrical source of the aircraft to the hub 1 are unimportant in the context of the present invention.

The rotor it fitted with a connector device for connecting electrical power between the hub 1 and the blades 2. The figures show arrangements relating to powering a single blade 2. Such arrangements should be transposed to each of the blades 2 mounted on the hub 1.

For each of the blades 2, the connector device uses a wired connection 4 that is provided at its ends with connectors 5, 6. Advantageously, the wired connection 4 is of the type arranged as a flat cable, incorporating a plurality of electrical power wires.

Advantageously, the connectors 5, 6 are formed of coaxial plugs that co-operate by interfitting with connectors 7, 8, a hub connector 8 being carried by the hub 1 and a blade root connector 7 being carried by the blade 2.

The wired connection 4 is housed in a housing 9 that is shaped in an arc that is centered on the pivot axis A of the blade 2. The housing 9 forms a module for protecting and mounting the wired connection 4 on a ring 10 that is fitted to the blade 2. The housing 9 forms a guide path that includes guide ramps 9A shown on FIG. 7. The guide ramps 9A are guide members that guide and shape the wired connection 4 so that the wired connection 4 is movable over itself. The ring 10 is mounted on the blade root 3 as shown in FIGS. 7 and 8, being centered about the pivot axis A of the blades 2.

A connector 6, fitted to the wired connection 4 at one of its ends, is mounted on the ring 10 so as to co-operate with the blade root connector 7. In the embodiment shown, a first end segment 11 of the wired connection 4 is secured at one of its ends to the blade 2, and at its other end, it includes the blade root connector 7.

At its other end, the wired connection 4 has a connector for co-operating with the hub connector 8. More particularly, the connector 5 of the wired connection 4 is formed at the end of a second end segment 12 of the wired connection 4.

In FIGS. 1 to 6, the wired connection 4 is held in a generally arcuate shape that is centered on the pivot axis A of the blade 2, by means of a guide path that guides the wired connection 4 to move over itself.

In the embodiment shown, it should be considered that said first and second end segments 11, 12 of the wired connection 4 are not involved with the wired connection 4 being guided to move over itself by the path.

Such a path includes at least one deflector member 13 for causing the wired connection 4 to double back onto itself, thereby giving a looped shape. The path may also include two spaced-apart, facing, curved walls 14, 15 that are centered on the pivot axis A. Between them, said walls 14, 15 form a holding space for holding the wired connection 4 in an arcuate shape. Advantageously, said walls 14, 15 are formed by a wall of the housing 9 and by a wall of the ring 10, respectively. The deflector member 13 forms a guide member 13A shown on FIG. 7. Guide members 13A guide and shape the wired connection 4 so that the wired connection 4 is movable over itself.

The wired connection 4 is caused to move over itself under the effect of the blade 2 pivoting. In the preferred arrangements shown in the figures, the wired connection 4 is also caused to move over itself under the effect of at least one of the deflector members 13 moving. In such arrangements, the deflector member 13 is mounted on the hub 1 to move along a shaped track 16 that is provided with elastically-deformable means 17 that are interposed between the shaped track 16 and the deflector member 13. By way of example, each of the deflector members 13 is in the form of a grooved wheel, with the looped wired connection 4 bearing against the grooved wheel. At least one of the deflector members 13 is preferably mounted on the hub 1 so as to be freely rotatable.

Relative to a reference position of the blade 2 as shown in FIGS. 1 and 4, the blade 2 is capable of pivoting:

in a first direction S1 through an angle of about 20°, as shown in FIGS. 2 and 5; and in a second direction S2 opposite to the first direction S1 through an angle of about 90°, as shown in FIGS. 3 and 6.

Such pivot directions S1 and S2 and such pivot angle values of the blade 2 are given by way of illustration.

The path provides guidance under tension for the wired connection 4, e.g. via elastically-deformable means 17 that are interposed between said at least one deflector member 13 and the shaped track 16.

Under the effect of the blade 2 pivoting in an initial direction S1 or S2, the wired connection bears against a deflector member 13 and causes it to move along the shaped track 16. Pivoting of the blade 2 in the opposite direction S2 or S1 requires the wired connection 4 to move over itself in the opposite direction. Said deflector member 13 is thus moved spontaneously by the elastically-deformable means 17 and causes the wired connection 4 to move over itself, accompanying the pivoting of the blade 2.

More particularly, the deflector member 13 is caused to move along the shaped track 16 in opposite directions. In the first direction, the deflector member 13 is moved under the effect of the traction exerted by the wired connection 4 that is driven by the pivoting blade 2. In the second direction, the deflector member 13 is moved under the effect of the thrust exerted by the elastically-deformable means 17, the member thus pushing back the wired connection 4 to accompany pivoting of the blade 2.

In FIGS. 1 to 3, it can be seen that for a given pivot angle of the blade 2, the angular movement of the deflector member 13 corresponds to half of the pivot angle of the blade 2.

In FIGS. 4 to 6, it can be seen that for a given pivot angle of the blade 2, the angular movement of each of the two deflector members 13 corresponds to one fourth of the pivot angle of the blade 2.

Such movement of the deflector member(s) makes it possible to compensate for the variation in length of the loop formed by the wired connection 4 between the connectors 5, 6 that are fitted to the wired connection 4. Such compensation of variation in length is obtained while holding the wired connection 4 in shape and ensuring its continuity between the connectors 5, 6.

Shaping the wired connection 4 into a loop and having deflector member(s) 13 that is/are resiliently movable provides a satisfactory compromise between optimizing the wired connection 4 accompanying any pivoting of the blade 2, and limiting the size of the wired connection 4 and of the path.

Holding the wired connection 4 in an arcuate shape about the pivot axis A of the blade 2 makes it possible to make the wired connection 4 as compact as possible, and makes it easier to protect it and to house it inside said housing 9 placed around at least part of the ring 10 that carries it.

In FIGS. 7 and 8, the end face of the ring 10 oriented towards the blade 2 is closed by two covers 18 that are mounted on the blade root 3. A shield 19 that is mounted on the hub 1 protects the housing 9. The shield 19 includes holes through which there emerge rings 10 respectively equipping each of the blade roots 3.

What is claimed is:

1. A rotary-wing aircraft rotor fitted with a connector device for connecting electrical power between a hub and blades of the rotor, each of the blades being provided with a blade root via which the blade is mounted individually on the hub so as to pivot in its general plane about a pivot axis, the connector device comprising, for each of the blades:
   at least one wired connection that acts, via connectors fitted to opposite ends of the wired connection, to connect together a hub connector that is carried by the hub and a blade connector that is carried by the blade;
   attachment means for attaching the wired connection, between the opposite ends, to the hub and to the blade root respectively, accompanying pivoting movement of the blade root; and
   a guide path for guiding the wired connection of the blade, the guide path having opposite ends;
   wherein, the guide path includes tensioning means for putting the wired connection resiliently under tension, the wired connection being guided to move over itself under tension by the guide path, while accompanying the pivoting movement of the blade root, wherein the guide path includes at least two deflector members, each deflector member causing the wired connection to back onto itself and shaping the wired connection into at least one loop, with each of the two deflector members being put resiliently under tension by the tensioning means towards one opposite end of the guide path.

2. An aircraft rotor according to claim 1, wherein the wired connection is held, by the path, in a generally arcuate shape that is centered on the pivot axis, the wired connection being guided to move over itself about the pivot axis.

3. An aircraft rotor according to claim 2, wherein the path includes two facing curved walls that are centered on the pivot axis, the walls forming between them a space for holding the wired connection in an arcuate shape.

4. An aircraft rotor according to claim 1, wherein the path includes at least one guide member for guiding and shaping the wired connection so that it is movable over itself, the guide member comprising at least any of the following guide members:
   the at least two deflector members for causing the wired connection to back onto itself into the at least one loop, the loop being movable over itself while accompanying the pivoting movement of the blade;
   one or more bearing fingers distributed along the wired connection, the bearing finger(s) holding the wired connection in shape;
   at least one guide ramp for guiding the wired connection in shape.

5. An aircraft rotor according to claim 3, wherein the path includes at least one guide member for guiding and shaping the wired connection so that it is movable over itself, the guide member comprising at least any of the following guide members:
   the at least two deflector members for causing the wired connection to double back onto itself into the at least one loop, the loop being movable over itself while accompanying the pivoting movement of the blade;
   one or more bearing fingers distributed along the wired connection, the bearing finger(s) holding the wired connection in shape;
   at least one guide ramp for guiding the wired connection in shape;
   and wherein the tensioning means for putting the wired connection under tension may equally well be interposed between:
   the wired connection and the at least one guide member; and/or
   the wired connection and the hub, via the at least one guide member.

6. A rotary-wing aircraft rotor fitted with a connector device for connecting electrical power between a hub and blades of the rotor, each of the blades being provided with a blade root via which the blade is mounted individually on the hub so as to pivot in its general plane about a pivot axis, the connector device comprising, for each of the blades:
   at least one wired connection that acts, via connectors fitted to opposite end of the wired connection, to connect together a hub connector that is carried by the hub and a blade connector that is carried by the blade;
   attachment means for attaching the wired connection, between the opposite ends, to the hub and to the blade root respectively, accompanying pivoting movement of the blade root; and
   a guide path for guiding the wired connection of each of the blades;
   wherein, for each of the blades, the guide path includes tensioning means for putting the wired connection resiliently under tension, the wired connection being guided to move over itself under tension by the path, while accompanying the pivoting movement of the blade root, wherein at least one deflector member is guided to move along a shaped track while accompanying the movement of the wired connection over itself, wherein the path includes at least one guide member for guiding and shaping the wired connection so that it is movable over itself, the guide member comprising at least any of the following guide members:

at least one deflector member for causing the wired connection to double back onto itself into at least one loop, the loop being movable over itself while accompanying the pivoting movement of the blade;

one or more bearing fingers distributed along the wired connection, the bearing finger(s) holding the wired connection in shape;

at least one guide ramp for guiding the wired connection in shape;

and wherein the tensioning means for putting the wired connection under tension comprise movably mounting the deflector member on the hub, and interposing elastically-deformable means between the deflector member and the shaped track formed on the hub.

7. An aircraft rotor according to claim 1, wherein the wired connection is housed, at least in part, inside a protective housing.

8. An aircraft rotor according to claim 4, wherein the wired connection is housed, at least in part, inside a protective housing, and wherein an assembly comprising the at least one guide member and the wired connection is housed in a housing, the housing forming a mounting module for mounting at least the wired connection or the at least one guide member on the hub or on the blade root.

9. An aircraft rotor according to claim 8, wherein the housing is at least arcuate in shape if not ring shaped, and is mounted on the blade root, with which blade root the housing moves together in pivoting.

10. An aircraft rotor according to claim 9, wherein the housing is carried by a ring that is mounted on the blade root and that is centered on the pivot axis.

11. An aircraft rotor according to claim 10, wherein, the ring has an end face, and at the end face of the ring oriented towards the blade, the ring is closed by covers that are mounted on the blade root and that are arranged laterally, on a side of the blade.

12. An aircraft rotor according to claim 10, wherein the hub is fitted with a peripheral shield that is centered on the axis of rotation of the hub, the shield forming a protective member for protecting the housing, and including respective through holes through which there pass respective rings that are mounted on the various blade roots.

13. An aircraft rotor according to claim 4, wherein the wired connection is housed, at least in part, inside a protective housing and wherein the attachment means are formed by the housing and by the at least one guide member mounted on respective members of the hub and the blade root.

14. An aircraft rotor according to claim 1, wherein the connectors are of the type having coaxial plugs for interfitting and for electrical connection.

15. An aircraft rotor according to claim 1, wherein the wired connection is arranged as a flat cable that incorporates at least one wire, the flat cable being held in shape in its general plane by the path.

16. An aircraft rotor according to claim 1, wherein the path is mounted, at least in part, equally well on the hub and on the blade root.

17. An aircraft provided with a rotor according to claim 1.

18. An aircraft rotor according to claim 6, wherein the elastically-deformable means form means for returning the deflector member into position, and for driving the wired connection under the effect of thrust exerted by the deflector member on the wired connection while accompanying pivoting of the blade in a predefined direction.

19. A rotary-wing aircraft rotor fitted with a connector device for connecting electrical power between a hub and blades of the rotor, each of the blades being provided with a blade root via which the blade is mounted individually on the hub so as to pivot in its general plane about a pivot axis, the connector device comprising, for each of the blades:

at least one wired connection that acts, via connectors fitted to opposite ends of the wired connection, to connect together a hub connector that is carried by the hub and a blade connector that is carried by the blade;

attachment means for attaching the wired connection, between the opposite ends, to the hub and to the blade root respectively, accompanying pivoting movement of the blade root; and a guide path for guiding the wired connection of each of the blades;

wherein, for each of the blades, the guide path includes tensioning means for putting the wired connection resiliently under tension, the wired connection being guided to move over itself under tension by the path, while accompanying the pivoting movement of the blade root, wherein the path includes at least one guide member for guiding and shaping the wired connection so that it is movable over itself, the guide member comprising at least any of the following guide members:

at least one deflector member for causing the wired connection to back onto itself into at least one loop, the loop being movable over itself while accompanying the pivoting movement of the blade;

one or more bearing fingers distributed along the wired connection, the bearing finger(s) holding the wired connection in shape;

at least one guide ramp for guiding the wired connection in shape;

wherein the wired connection is housed, at least in part, inside a protective housing, and wherein an assembly comprising at least one guide member and the wired connection is housed in a housing, the housing forming a mounting module for mounting at least the wired connection if not also at least one guide member that may equally well be on the hub or on the blade root;

wherein the housing is at least arcuate in shape if not ring shaped, and is mounted on the blade root, with which blade root the housing moves together in pivoting;

wherein the housing is carried by a ring that is mounted on the blade root and that is centered on the pivot axis; and wherein, the ring has an end face, and at the end face of the ring oriented towards the blade, the ring is closed by covers that are mounted on the blade root and that are arranged laterally, on a side of the blade.

20. A rotary-wing aircraft rotor fitted with a connector device for connecting electrical power between a hub and blades of the rotor, each of the blades being provided with a blade root via which the blade is mounted individually on the hub so as to pivot in its general plane about a pivot axis, the connector device comprising, for each of the blades:
- at least one wired connection that acts, via connectors fitted to opposite ends of the wired connection, to connect together a hub connector that is carried by the hub and a blade connector that is carried by the blade;
- attachment means for attaching the wired connection, between the opposite ends, to the hub and to the blade root respectively, accompanying pivoting movement of the blade root; and
- a guide path for guiding the wired connection of each of the blades;
- wherein, for each of the blades, the guide path includes tensioning means for putting the wired connection resiliently under tension, the wired connection being guided to move over itself under tension by the path, while accompanying the pivoting movement of the blade root,
- wherein the path includes at least one guide member for guiding and shaping the wired connection so that it is movable over itself, the guide member comprising at least any of the following guide members:
- at least one deflector member for causing the wired connection to back onto itself into at least one loop, the loop being movable over itself while accompanying the pivoting movement of the blade;
- one or more bearing fingers distributed along the wired connection, the bearing finger(s) holding the wired connection in shape;
- at least one guide ramp for guiding the wired connection in shape;
- wherein the wired connection is housed, at least in part, inside a protective housing, and wherein an assembly comprising at least one guide member and the wired connection is housed in a housing, the housing forming a mounting module for mounting at least the wired connection if not also at least one guide member that may equally well be on the hub or on the blade root;
- wherein the housing is at least arcuate in shape if not ring shaped, and is mounted on the blade root, with which blade root the housing moves together in pivoting;
- wherein the housing is carried by a ring that is mounted on the blade root and that is centered on the pivot axis; and
- wherein the hub is fitted with a peripheral shield that is centered on the axis of rotation of the hub, the shield forming a protective member for protecting the housing, and including respective through holes through which there pass respective rings that are mounted on the various blade roots.

* * * * *